(12) United States Patent
Yu et al.

(10) Patent No.: US 11,689,526 B2
(45) Date of Patent: Jun. 27, 2023

(54) ENSEMBLE METHOD FOR FACE RECOGNITION DEEP LEARNING MODELS

(71) Applicant: PAYPAL, INC., San Jose, CA (US)

(72) Inventors: Xiaodong Yu, Singapore (SG); Quan Jin Ferdinand Tang, Singapore (SG); Jiyi Zhang, Singapore (SG); Yuzhen Zhuo, Singapore (SG)

(73) Assignee: PAYPAL, INC., San Jose, CA (US)

( * ) Notice: Subject to any disclaimer, the term of this patent is extended or adjusted under 35 U.S.C. 154(b) by 832 days.

(21) Appl. No.: 16/689,045

(22) Filed: Nov. 19, 2019

(65) Prior Publication Data
US 2021/0150534 A1 May 20, 2021

(51) Int. Cl.
| | | |
|---|---|---|
| *H04L 9/40* | (2022.01) | |
| *G06Q 20/40* | (2012.01) | |
| *G06N 3/08* | (2023.01) | |
| *G06V 40/16* | (2022.01) | |
| *G06V 10/764* | (2022.01) | |

(Continued)

(52) U.S. Cl.
CPC .......... *H04L 63/0861* (2013.01); *G06N 3/08* (2013.01); *G06Q 20/40145* (2013.01); *G06V 10/24* (2022.01); *G06V 10/764* (2022.01); *G06V 10/809* (2022.01); *G06V 10/82* (2022.01); *G06V 40/172* (2022.01)

(58) Field of Classification Search
CPC ...... H04L 63/0861; G06N 3/08; G06N 3/045; G06V 40/172; G06V 10/24; G06V 10/764; G06V 10/809; G06V 10/82; H04W 12/06; H04W 12/77; G06Q 20/40145; G06Q 20/3274; G06F 18/254
See application file for complete search history.

(56) References Cited

U.S. PATENT DOCUMENTS

| | | |
|---|---|---|
| 2011/0255802 A1 | 10/2011 | Kameyama et al. |
| 2018/0082304 A1 | 3/2018 | Summerlin et al. |

(Continued)

FOREIGN PATENT DOCUMENTS

| | | |
|---|---|---|
| JP | 3927353 | 6/2007 |
| WO | WO 2018/203920 | 11/2018 |

OTHER PUBLICATIONS

Wallis. "Toward a unified model of face and object recognition in the human visual system", in frontiers in Psychology [online], pp. 1-25, published Aug. 15, 2013 [retrieved on Jan. 10, 2021] Retrieved from the Internet <URL: https://www.ncbi.nlm.nih.gov/pmc/articles/PMC3744012/> entire document, especially pp. 10.

(Continued)

*Primary Examiner* — Huan V Doan
(74) *Attorney, Agent, or Firm* — Haynes and Boone, LLP

(57) ABSTRACT

Aspects of the present disclosure involve systems, methods, devices, and the like for user identification using Artificial Intelligence, Machine Learning, and data analytics. In one embodiment, a verification system and method is introduced that can provide user authentication using parallel modeling for face identification. The verification system used includes a face identification module for use in the identification and verification using parallel processing of a received image with a claimed identity. The parallel processing includes an ensemble of machine learning models processed in parallel for optimal performance.

20 Claims, 6 Drawing Sheets

(51) Int. Cl.
    *G06V 10/80*     (2022.01)
    *G06V 10/82*     (2022.01)
    *G06V 10/24*     (2022.01)

(56) References Cited

U.S. PATENT DOCUMENTS

| | | | |
|---|---|---|---|
| 2020/0012962 A1* | 1/2020 | Dent | G06N 20/20 |
| 2020/0104876 A1* | 4/2020 | Chintakindi | A61B 5/1112 |
| 2021/0089635 A1* | 3/2021 | Weeresinghe | G06Q 20/40145 |
| 2022/0139109 A1* | 5/2022 | Hamami | G06F 21/32 |
| | | | 382/118 |

OTHER PUBLICATIONS

Weiyang Liu et al., SphereFace: Deep Hypersphere Embedding for Face Recognition, PiarXiv: 1704.08063v4 [cs.CV] Jan. 29, 2018, <http://https://github.com/wy1iu/sphereface>.
International Appl. No. PCT/US2020/61259, International Search Report and Written Opinion dated Feb. 9, 2021, 12 pages.
International Preliminary Report on Patentability for Application No. PCT/US2020/061259 dated Jun. 2, 2022, 6 pages.

\* cited by examiner

US 11,689,526 B2

ENSEMBLE METHOD FOR FACE RECOGNITION DEEP LEARNING MODELS

TECHNICAL FIELD

The present disclosure generally relates to user authentication, and more specifically, to user authentication using parallel modeling for face identification.

BACKGROUND

Nowadays with the proliferation of electronics, users are constantly relying on their electronics for access to social media, transacting, messaging, etc. However, with such reliance comes the need for remote connectivity and authentication. User authentication and consequently verification are instrumental in ensuring a user information is securely and correctly accessed. User authentication and verification often require the use of passcodes, phrases and other forms of input mechanisms. Such authentication processes may be cumbersome and time consuming as passwords may be forgotten, authentication with a service agent may require lengthy conversations with a with a service agent. Thus, some authentication has turned to the use of biometric information. This type of verification although faster and more reliant, may require the use of complex computations whose performance may be subpar. Therefore, it would be beneficial to have a method for authenticating which is both secure and user friendly.

Figure 1:
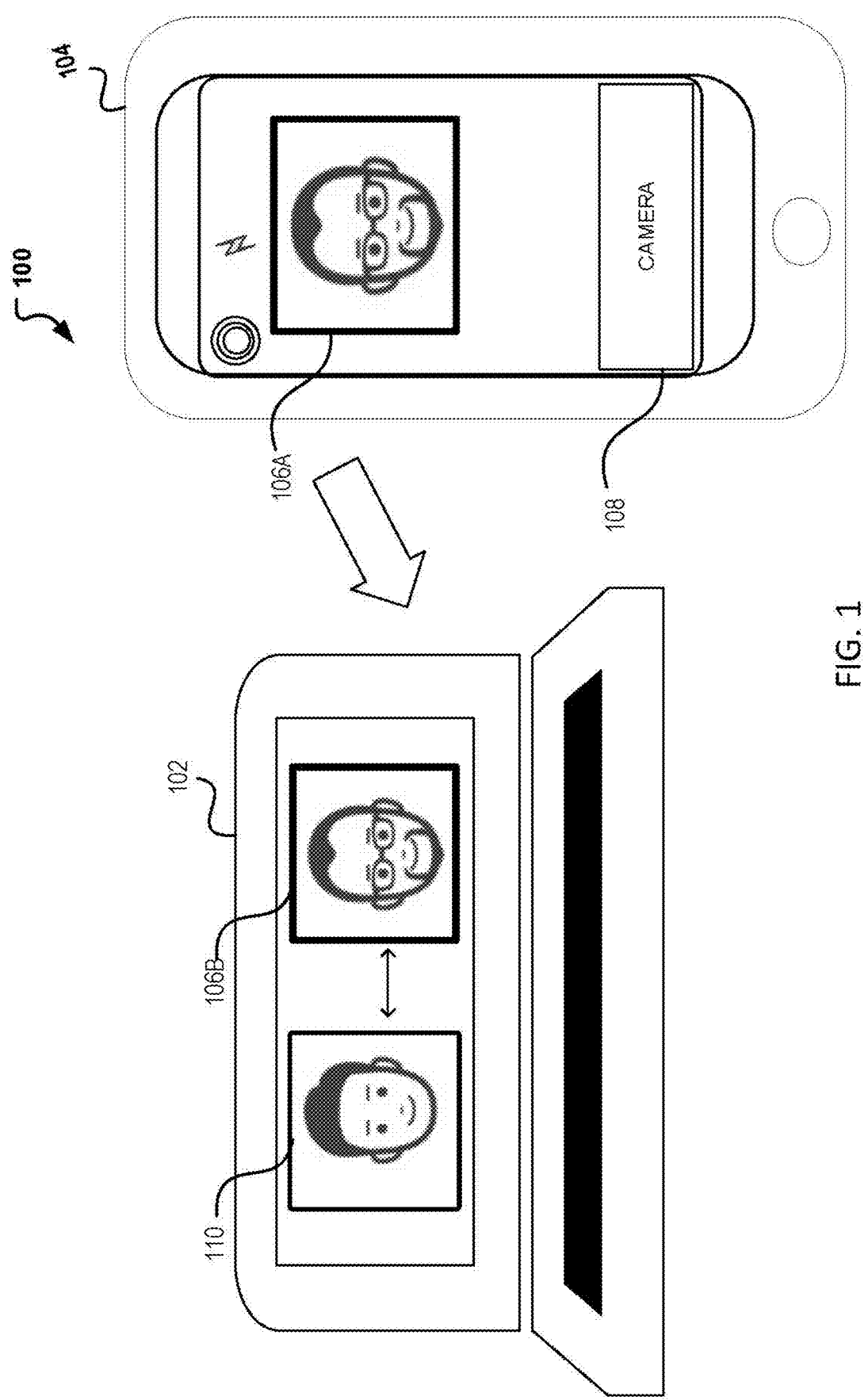
FIG. 1 illustrates exemplary face identification.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for user identification using Artificial Intelligence, Machine Learning, and data analytics. In one embodiment, a verification system and method is introduced that can provide user authentication using parallel modeling for face identification. The verification system used includes a face identification module for use in the identification and verification using parallel processing of a received image with a claimed identity. The parallel processing includes an ensemble of machine learning models processed in parallel for optimal performance.

User identification and verification is an instrumental part of account authentication that often requires the use of passcodes, phrases, and other forms of input mechanisms. Such authentication processes may be cumbersome and time consuming as passwords may be forgotten, authentication may require user communications with a service agent, and/or other input may require multi-step processes for account and information retrieval. To avoid such processes, industry and academia have considered biometric authentication. Biometric authentication provides a quicker, less cumbersome authentication with a simple fingerprint hold, biometric read, or even a face ID.

Face identification has become increasingly popular with technological advancements focused on face detection and recognition algorithms. Generally, the face recognition algorithms operate by comparing facial features in a database to a photograph, video, camera 108 capture, etc. Then, with the use of a biometric artificial intelligence algorithm, analysis may be performed to determine if the photograph indeed matches those facial features in the database. If the features match, face identification is achieved and verified.

FIG. 1 presents exemplary face identification and verification. In particular, FIG. 1 illustrates, face identification 100 as performed by a user on a personal device 104. The personal device 104 may be a tablet, iPad, cell phone or the like. For exemplary purposes, personal device 104 can be a smart phone. The personal device 104 may be used for web browsing, video streaming, bill payments, and online purchases. Additionally, the personal device 104 may be equipped with applications that enable the user to make purchases and transfers using payment provider applications and/or a digital wallet. Further, the personal device 104 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. For example, the personal device 104 can be used to communicate with a user device 102. In the communication, the user may use a gallery and/or the camera in the personal device 104 for taking, retrieving, or accessing an image 106A of the user for use in authentication. The image as illustrated at FIG. 1, is obtained and communicated to the user device 102.

The user device 102, may also be tablet, iPad, smart phone, desktop, or the like. For exemplary purposes, the user device 102 is a desktop or other verification processing system used in the identification and authentication. The user device 102 may be equipped with various applications for performing similar tasks as indicated with personal device 104. In addition, user device 102 may be used for face identification and authentication of the user. For example, the user device 102 may receive the image 106A from personal device 104. The image 106A may be communicated to user device 102 and received as image 106B. The user device 102 may then access a database with previously stored images and/or features of the user for comparison, matching, and identifying. For the identifying, artificial intelligence may apply machine learning techniques. The machine learning techniques may use one or more models for performing data analytics to identify patterns between the received image 106B and the retrieved image 110 to make a decision. Additionally or alternatively, the data analytics may be used to identify patterns between the received image 106B and features retrieved from the user to make the decision. Conventionally, the one or more models can make a prediction on whether the images 106,108 are a match. However, conventional models generally work independently or serially when performing the data analytics, which may result in misidentification, false positives, or results which lack the desired confidence. As such, there is a probability that the received image 106B may not be correctly matched as the user facial hair and eyewear have changed in comparison with to the retrieved image 110. Therefore, it would be beneficial to identify a more robust system and method that can perform the data analytics required to obtain a more reliable identification. In one exemplary embodiment, data analytics include parallel modeling.

Figure 2:
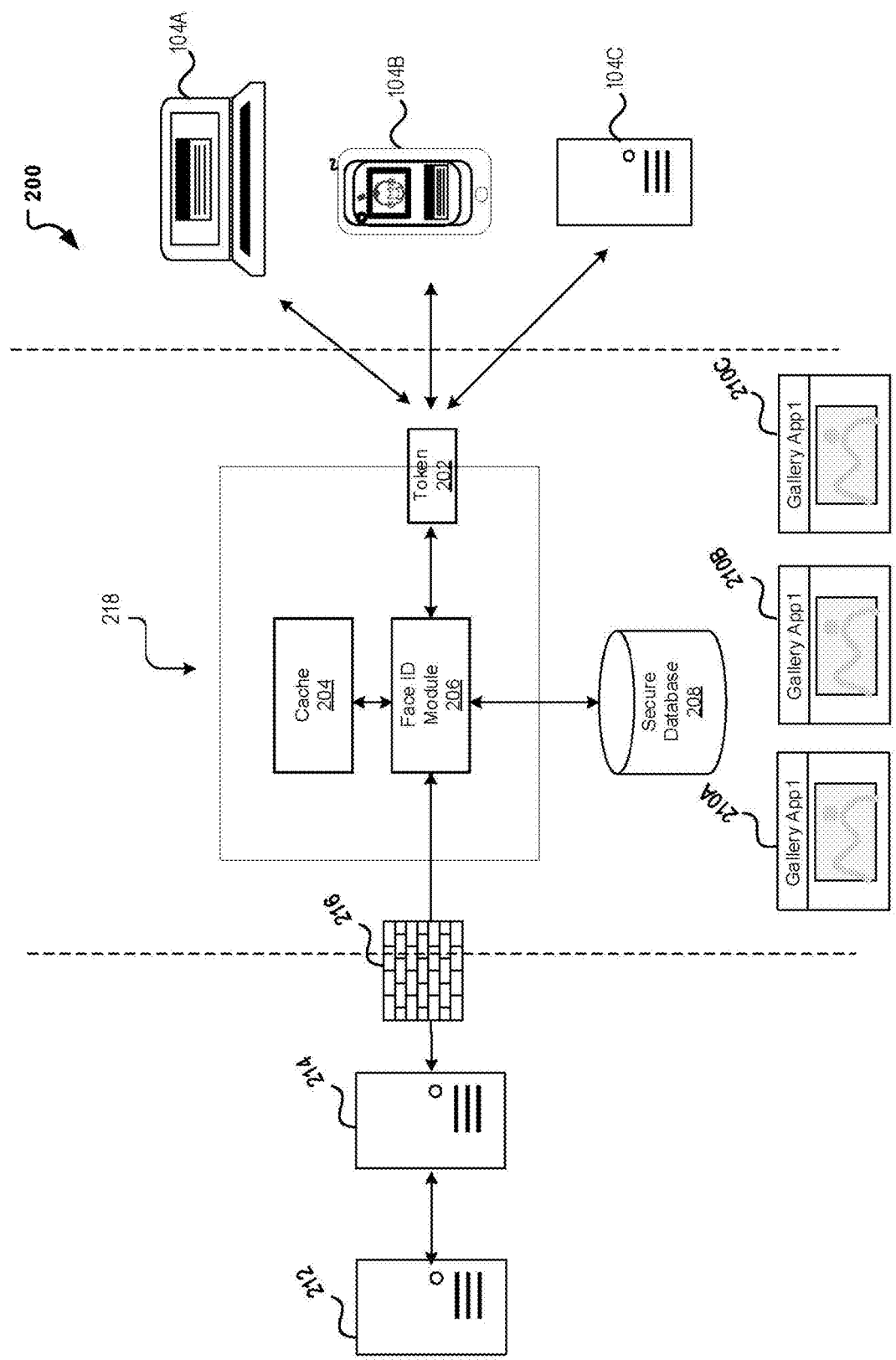
FIG. 2 illustrates a block diagram illustrating an exemplary architecture for face identification and authentication.

FIG. 2 illustrates a system designed to provide this improved identification. In particular, FIG. 2 illustrates a block diagram illustrating an exemplary identification system architecture 200 for face identification/recognition and verification. Face recognition includes identifying a user based on the received image 106B of a face. The received image 106B may be compared with all registered users. Verification includes validating the claimed identity based on the received image 106B of the face and either accepting or rejecting the identity claimed (e.g., retrieved image 110). The identity claimed can be an ID photo, a unique registered account, and the like.

In one embodiment, the received image 106B, as indicated, may derive from a user device 104. For exemplary purposes, verification system 200 includes a laptop 104A, smart phone 104B, server 104C, or other communication device which may be used to take, retrieve, and/or transmit the image 106A. In transmitting the image 106A, to ensure the transmission remains private, a token 202 and port may be used wherein the image and/or other data is encrypted. In some embodiments, to maintain security, an secure sockets layer (SSL) certificate may be used for authenticating the critical and private image 106 and information. In other embodiments, a token 202 may be used to certify the identity and maintain security. Still in another embodiment, the token 202 in conjunction with a secure port may be used.

Once past the token 202 and secure port, the received image 106B arrives at internal verification system 218 where face identification may occur. At the internal verification system 218 the received image 106B may be received and processed by a face ID module 206 wherein a plurality of models may be used in the face identification. Therefore, the face ID module 206 may be used for user recognition based in part on the received image 106B. For the face recognition, the received image 106B may be compared with other registered users. Once recognition is achieved, the face ID module 20 may also be used for verification, where verification can include validating the identity of the user based on the received image 106B. The verification thus determines if the received image 106B matches the identity claimed as presented in the image 110 and/or features retrieved. Further detail on the system and method for performing the recognition and verification are described below and in conjunction with FIGS. 3-4.

To perform the recognition and verification, the verification system 218 securely stores the received image 106 and corresponding user information and retrieves associated information. For the retrieval, a secure database 208 may be accessed. This database 208 may include and/or collaborate with other databases for the retrieval of the claimed image or features. In one embodiment, a plurality of galleries 210A-210C may exist which include the features of previously identified users. Therefore, user image may be encrypted and stored in at least the secure database 208 and/or a combination of the galleries 210. Keys, encryption tokens, and other authentication methods may be used for the retrieval and storage of the user image. Similarly, user information may be stored and accessible via secure access to a proxy server 214 and security module 212 where user information may be accessed and retrieved/stored after correct key or token exchange. In one embodiment, a firewall 216 may also be available to further protect and block unauthorized access. For data manipulation, cache 204 may be available but limited to non-secure data manipulation.

Figure 3:
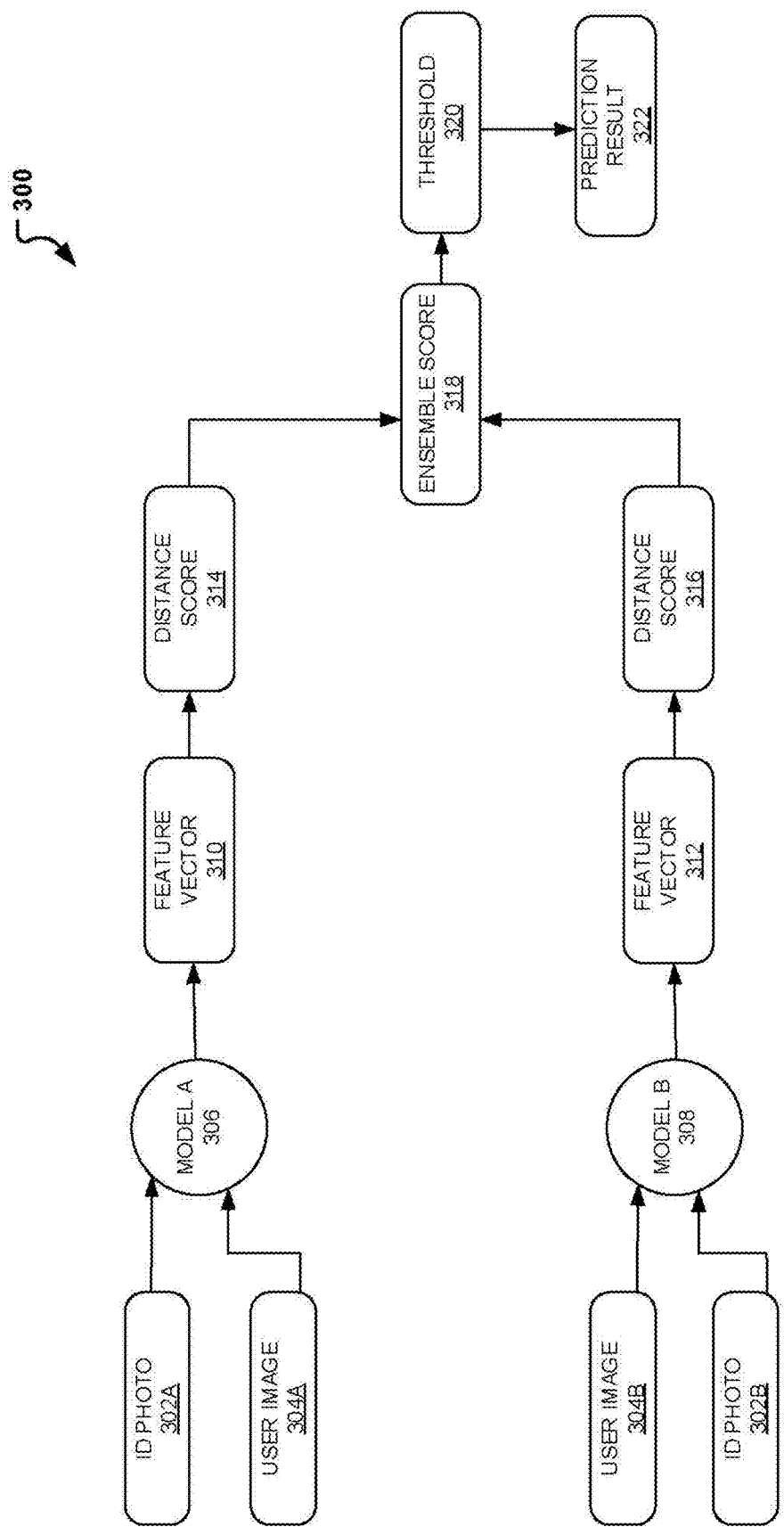
FIG. 3 illustrates exemplary block diagram of parallel modeling for face identification.

Turning next to FIG. 3, the method for face ID verification and recognition is presented. As indicated, serial data analytics used for face recognition may provide results that are subpar. As such, a new system and method is introduced which enables face verification and recognition using parallel data modeling. FIG. 3 illustrates an exemplary block diagram of parallel modeling 300 for face identification. In one embodiment, for the parallel modeling 300, a machine learning ensemble model is presented. The parallel modeling 300 can include the use of two distinct models (e.g., Model A 306, Model B 308) for determining if face identification is achieved and the claimed identity is verified. In one embodiment, the distinct models 306,308 run in parallel each with a corresponding feature vectors 310,312 and distance scores 314,316 which can be used cumulatively to provide a final score (e.g., ensemble score 318) and prediction (e.g., prediction result).

In one exemplary example, a user may transmit an identification request to the verification system. The request may include user information and at least an image or user selfie 304 which is received at the transmitted image 106 at internal verification system 218. Once the internal verification system 218 and after secure retrieval and data processing, an identifying photo 302 may be retrieved and used in the verification. In one embodiment, the received image 106B and the retrieved identifying image are both input to the individual models. In other words, the identifying photo is input as ID photo 302A into a first machine learning model A 306 and the same identifying photo is input as ID photo 302B into the second machine learning model B 308. Simultaneously, the received image is input as a user image 304A, 304B into model A, B respectively. Model A may then take the ID photo 302A and user image 304A and process the information accordingly such that a first feature vector 310 is obtained and used in determining a corresponding first distance score 314. Similarly, model B may take user image 304B and ID photo 302B and process the information accordingly such that a second feature vector 312 and corresponding distance score 316 is obtained. Note that in some embodiments, a single input may exist for both the ID photo 302 and user image 304 for both model A 306 and model B 308.

Model A 306 and model B 308 may be distinct models which use two distinct feature vectors 310, 312 and of distinct size. In one exemplary example, model A 306 can include a model used to map the face images to a distance and determine similarity based on the distance. In another exemplary example, model B 308 can include a model that includes deep learning with the use probabilities for determining a similarity. Accordingly, the two models 306,308 can include feature vectors 310,312 which are quite distinct. In one embodiment, for example, the first model A 306 can include a vector of 128-dimension features while the second model B 308 can include a vector of 512-dimension features.

In response to the feature vectors 310,312 a distance score may be computed 314,316 which may entail the similarity between the features. Thus, each computation may include a different threshold considered in determining a similarity (between ID photo 302 and the user image 304) the and thus a predicted match. In one embodiment, model A 306 may include a first threshold value and a model B 308 with a second threshold value greater than the first. In addition, in computing the distance score, various methods may be used. For example, an absolute value norm, Euclidean distance, L-norm, and the like may be used. In one embodiment, an L-2 distance may be used for distance measurement and normalization. Then, once distances are computed, the parallel data modeling is ensembled to provide a single ensemble score 318 that may be compared against an identification threshold 320 that will allow the system to make a final prediction (e.g., prediction result 322) regarding the claimed identity. In one embodiment, the threshold may be selected as an average of the distance scores and/or some adjustment. Alternatively, the threshold may be a predetermined value that is tuned for the analysis at hand. Note that the threshold values may be determined offline and during the training process which may be optimized based on an analysis of the false/true positives. Therefore, instead of relying on the use of a single distance score as commonly done, here the an ensemble score may be obtained as a result of the two (normalized) distance scores obtained during the parallel processing. Consequently, the prediction result 322 can result in an indication as to whether a successful match exists (or not) with regards to a match to the claimed identity.

Note that presented herein is an exemplary parallel processing model used for face identification. The model however is not so restricted and can include more or less modules for performing the data analytics. For example, some modules may be included and used for face alignment where the selfie or received image 106B includes a background that may be cropped, and face aligned and centered. In another example, additional modules may be included and used for preprocessing of the received image. This may be done in instances where the received image 106B includes a user that is not looking forward directly, sideways or may otherwise require processing before the face identification analytics may be performed. Still in another example, other modules may be included to help alleviate low-resolution. Thus, processing of the received image 106B may occur that will enhance the resolution and improve the overall identification performance.

In addition, the models presented here stem from convolutional neural networks (CNN) for use with image processing, however other models may be used including but not limited to artificial neural networks, structured prediction, clustering, dimensionality reduction, etc. Further, the models may both be CNN models, mix of CNN and other model, or any combination thereof. In addition, further to the use of threshold values for making a decision, other decision methods may be applicable. For example, ranking may be used for making a decision.

Figure 4A:
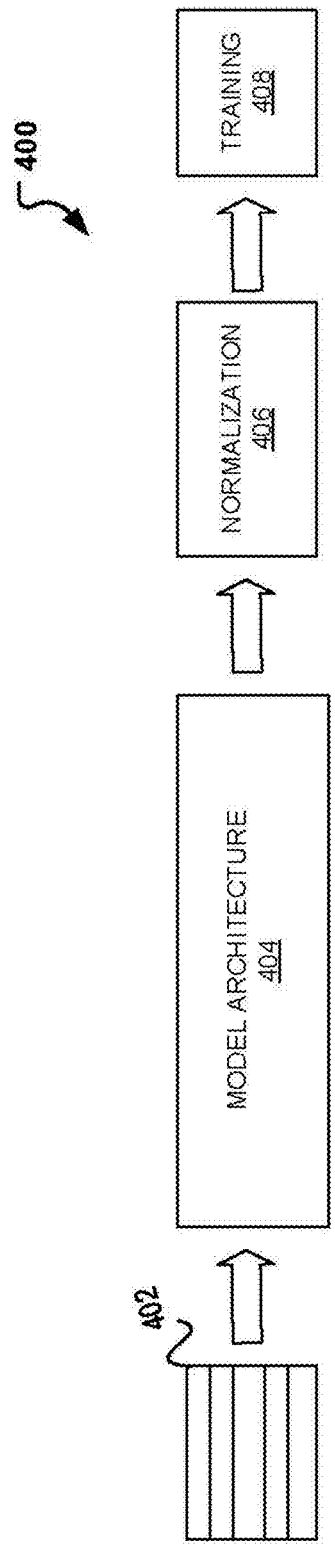
FIGS. 4A-4B illustrate exemplary models used for face identification
Figure 4B:
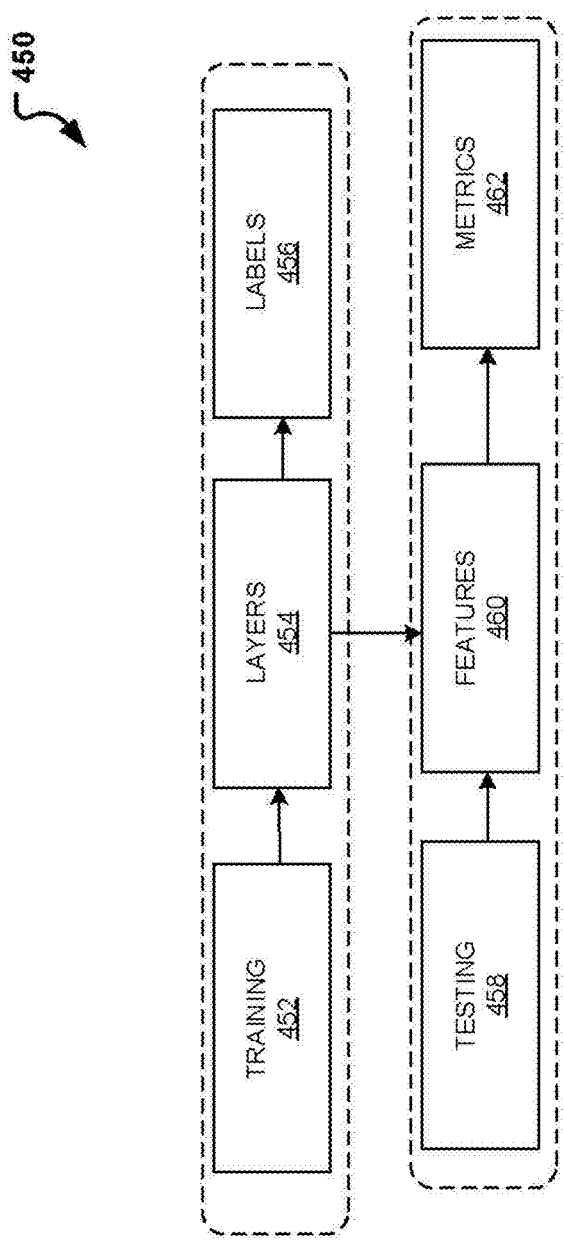

As indicated, parallel processing introduced herein enables the use of two distinct models for making a face identification. Model A 306 and Model B 308 where introduced and described to include an exemplary method for how the final prediction is achieved. Because image processing is considered here, nearby pixels may be strongly related and as such deep learning is often required. In one embodiment, two distinct CNN models are used and executed for use in the face identification. FIGS. 4A-4B include exemplary models that may be used in the analysis of the facial data. These exemplary models will be described in more detail below and in conjunction with FIGS. 4A-4B.

Turning first to FIG. 4A, a first model 500 is introduced which may be used in conjunction with verification system 200 for the parallel processing in the image identification. The first model 500 may include a convolution neural network model as maybe required for its deep learning capabilities and techniques often optimal in image recognition. In the first model, a simplified version is expressed wherein the batch information or images 402 are input to the model architecture 404. The model architecture 404 can include a CNN model A 306 which may be used for performing the matching involved between the received image 106B and the claimed identity 110. Upon completion of the processing by the model architecture 404, the model information may be normalized 406. As is understood, magnitude and length of vectors is often required when using machine learning algorithms. In one embodiment, an L2 norm may be calculated and used in calculating the vector magnitudes/lengths commonly referred to as vector norms in the normalization process. In other embodiments, L1 norm, max norm, and other normalization techniques may be used. After normalization, face embedding (not shown) may occur. Face embedding may include the analyzing and return of numerical vectors representing the detection of the facial image in a vector space. In one embodiment, model A 306 may include a first set of feature vectors (e.g., 128-dimension features). The first model 500 may then conclude with training (e.g., triplet loss) which may the comparison of a baseline value with the of a negative input. As indicated in parallel modeling 300, the model can then provide a distance score which may be used in conjunction with the second model B 308 for computing the ensemble score 318.

Turning next to FIG. 4B, an exemplary second model B 550 is illustrated. The exemplary model may also be a CNN model for its deep learning capabilities and ability to provide superior face recognition results. The CNN model (e.g., SphereFace) much like model A 500 may also include the input data (e.g., images) and various computational modules. For example, training 452, embedded layers 454 and feature vectors 460. Thus, model B 550 may entail the convolutional architecture where training may also occur and the fully connect layers where embedding and feature vector with a varying dimension (e.g., 512) over model A 500 may exist. Thus, at model B 500, included in the diagram is the training 452 that occurs in association with the model, wherein in addition to the layers 454, the labels 456 are also determined for the given face. In addition, optimization schemes may also be added and use to determine a more stable gradient using probabilities such that the labels may be identified. Then during the identification process, the features vector 460 (of predetermined dimension) may be used and metrics determined 462. Note that these models 500, 550 are used for exemplary purposes and other models and combination of models may be used for the face identification in parallel modeling 300.

Figure 5:
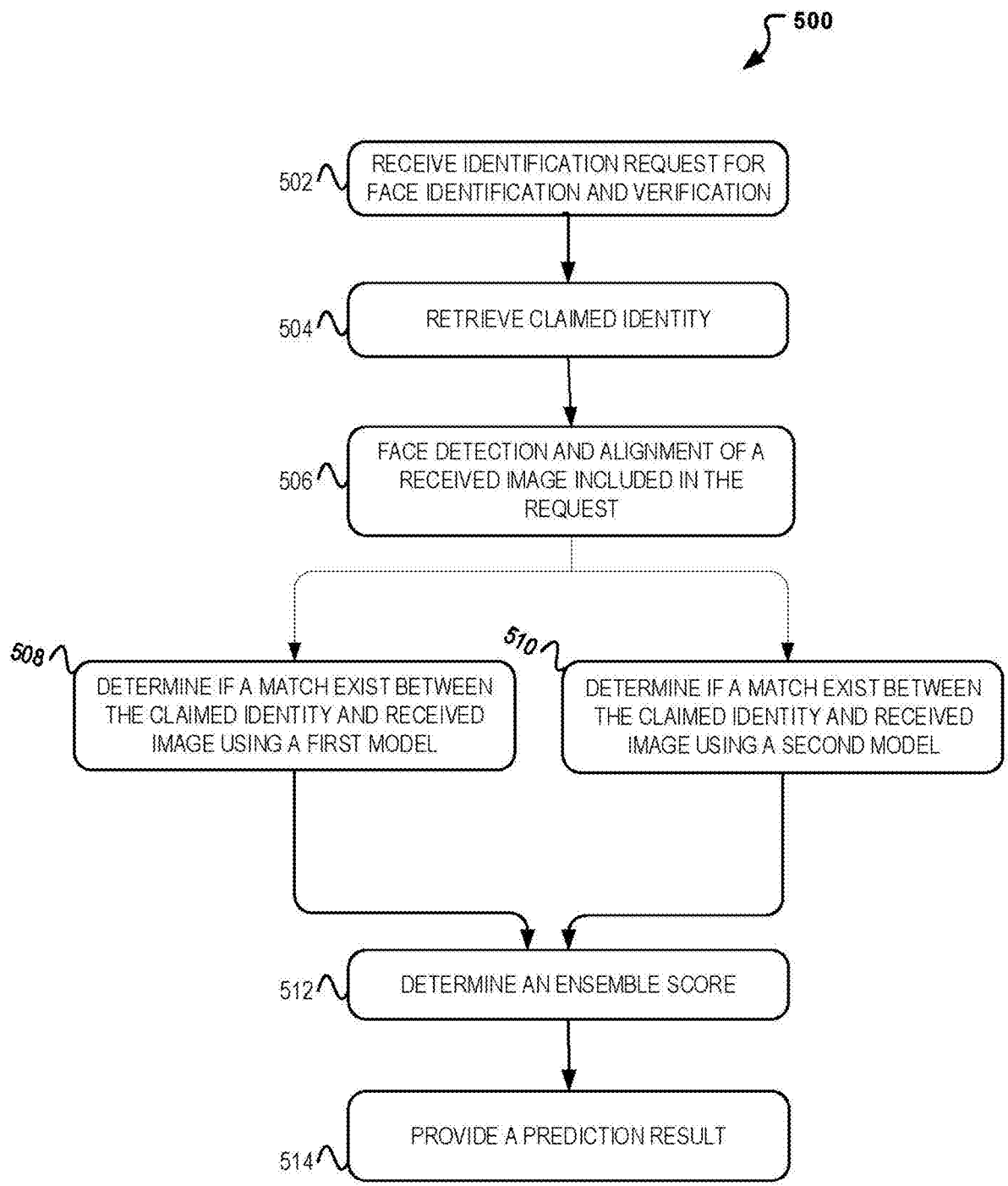
FIG. 5 illustrates a flow diagram illustrating operations for performing face identification and authentication.
Figure 6:
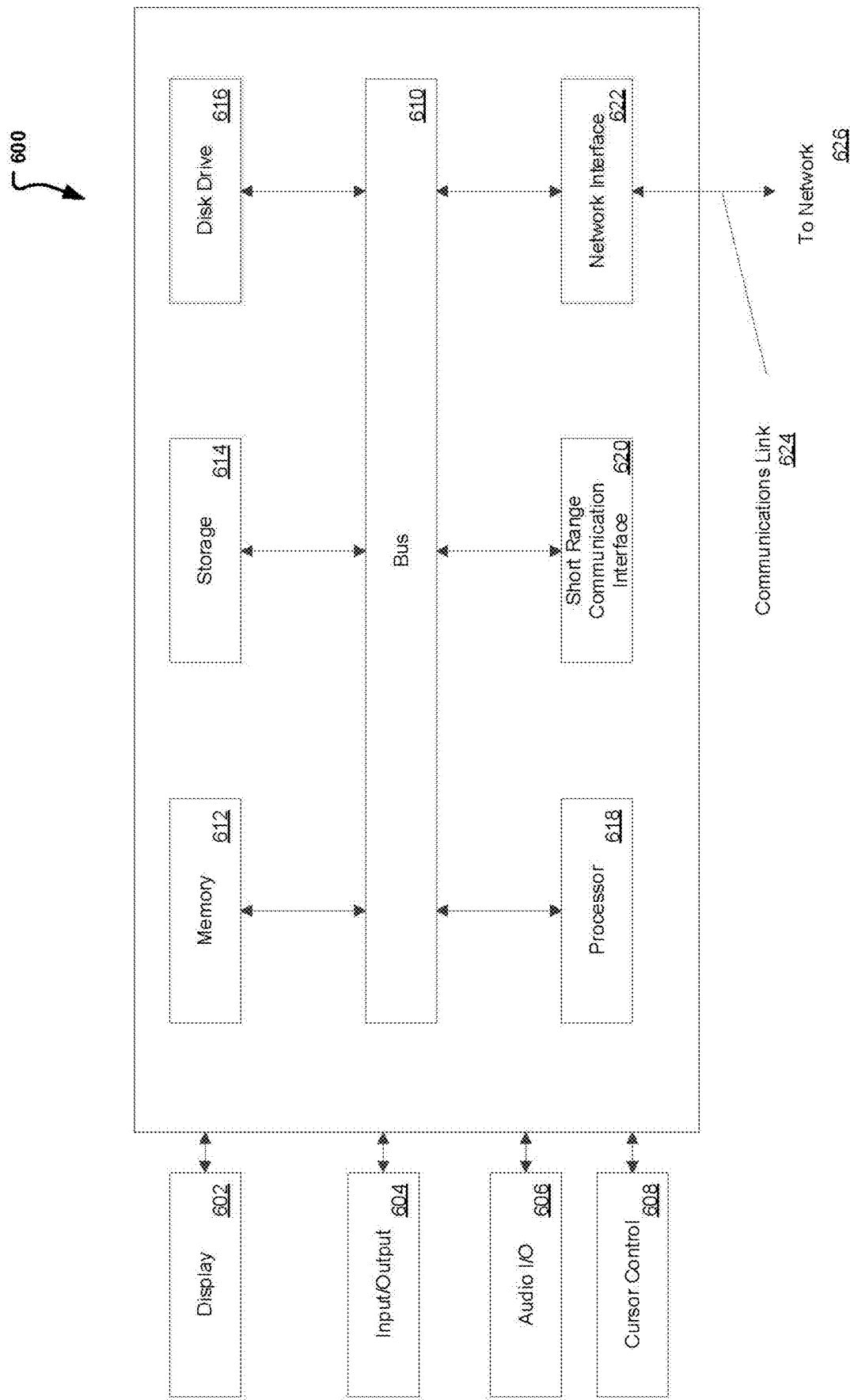
FIG. 6 illustrates an example block diagram of a computer system suitable for implementing one or more devices of the communication systems of FIGS. 1-5.

To illustrate how the verification system may be used, FIG. 5 is introduced which illustrates example process 500 that may be implemented on a system 600 of FIG. 6. In particular, FIG. 5 illustrates a flow diagram illustrating how a verification system provides the ability to identify and verify a claimed identity. According to some embodiments, process 500 may include one or more of operations 502-514, which may be implemented, at least in part, in the form of executable code stored on a non-transitory, tangible, machine readable media that, when run on one or more hardware processors, may cause a system to perform one or more of the operations 502-514.

Process 500 may begin with operation 502, where a request for a face identification is received. As previously indicated, verification system 200 entails the receipt of a request and received image 306b from a user device associated with the person requesting access and/or identification. The request may include an input and image capture from the user device 102. In most instances, the image capture may derive from a camera on the user device 102. In other instances, the image may derive from a video, iPhone, or other device which is capable of transmitting and communicating with the verification system 200. With the request for verification, additional user information may also be transmitted enabling the retrieval of a claimed identity or retrieved image 110 at operation 504. Therefore, the claimed user information is obtained and used to retrieve one or more images stored in the secure database 208 and/or associated galleries 210.

At operation 506, image pre-processing may occur. The pre-processing may include cropping and aligning of the received image 106B. For example, in the instance that the received image 106B is not aligned, at receipt, the image may be pre-processed to aligned to enable adequate facial detection and verification. Similarly, in another example, in the instance where the image includes a background or is received where the user is at an angle, further pre-processing may also occur to enhance the received image and consequently the facial detection. Still in another example, the received image 106B may be pre-processed if the image resolution is poor or low and resolution pre-processing may be used to improve the image resolution and overall system performance. Note that in some embodiments, pre-processing may not be needed and as such operation 506 maybe optional.

Next, as pre-processing is completed, the process 500 continues to the facial recognition models. As indicated above and in conjunction with FIG. 3, the verification system 200 includes an ensemble parallel processing wherein two or more distinct models are used for the facial identification. As such, process 500 includes operations 508, 510 where the received image 106B is matched against the claimed identity (e.g., retrieved image 110). The two models used in the exemplary block diagram of FIGS. 3-4B may be convolutional neural network models which use a combination of feature vectors, distance computations, and normalization for a first determination (e.g., score) for the received image 106. Thus, at operation 508 a first determination is made on whether a match exists between the claimed identity 110 and the received image 106B using the first model (e.g., model A 306). Similarly, and in parallel, at operation 510, a second determination is made on whether a match exists between the claimed identity 110 and the received image 106B using the second model (e.g., model B 308).

The determinations or scores may then be jointly used to obtain an ensemble score 318 at operation 512. In one embodiment, the ensemble score 318 may be an average score. In other embodiments, the ensemble score may be a dynamically adjusted score determined at least in part from the models, features, and other normalization parameters. The score may then be used to make a prediction regarding the facial identification at operation 514. The prediction result made as an outcome of the comparison between the ensemble score and a threshold value. Therefore, if the prediction is that indeed a match exists between the received image and the claimed identity, a response to the validation request or image received may be transmitted. In this instance, a successful access or message may be transmitted to the user device associated with the user of the received image. Alternatively, if the validation system determines that the prediction determined that a match does not exist, then a failure notification or access request failure may be transmitted to the user device.

Note that these operations are presented as exemplary processed and more or less operations may be involved in the process. In addition, although two models are used herein, not this facial identification process can be extended to include more models and the ensemble score may be determined and updated accordingly.

FIG. 6 illustrates an example computer system 600 in block diagram format suitable for implementing on one or more devices of the system in FIGS. 1-5 and in particular verification system 200. In various implementations, a device that includes computer system 600 may comprise a personal computing device (e.g., a smart or mobile device, a computing tablet, a personal computer, laptop, wearable device, PDA, etc.) that can communicate with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute instructions to cause the system to perform operations comprising:
receiving, via a wireless network communication, a request for a user identification, the request including user information and a user image;
retrieving a claimed image corresponding to the user image based in part on the user information received;
inputting the claimed image and the user image to a plurality of parallel learning models in a face identification module;
determining, from the plurality of parallel learning models, a plurality of user image vectors from the user image and a plurality of claimed image vectors from the claimed image, wherein each of the plurality of user image vectors has a corresponding one of the plurality of claimed image vectors, and wherein the each of the plurality of user image vectors and the plurality of claimed image vectors have a distinct length of n-dimension features based on a corresponding one of the plurality of parallel learning models used for vector output;
determining, by the face identification module, an initial score associated with each of the plurality of parallel learning models based on comparing each of the plurality of user image vectors to the corresponding one of the plurality of claimed image vectors;
determining, by the face identification module, a final score incorporating the initial scores associated with each of the plurality of parallel learning models; and
transmitting, over the wireless network communication, a user authentication in response to the request for the user identification when the final score meets an ensemble criteria.

2. The system of claim 1, wherein the operations further comprise:
transmitting, over the wireless network communication, a user authentication failure in response to the request for the user identification when the final score does not meet the ensemble criteria.

3. The system of claim 1, wherein the operations further comprise:
in response to retrieving the claimed image, preprocessing the user image to align the user image with the claimed image.

4. The system of claim 1, wherein the operations further comprise:
in response to retrieving the claimed image, preprocessing the user image to correct poor image resolution.

5. The system of claim 1, wherein each of the plurality of parallel learning models include varying feature dimensions.

6. The system of claim 1, wherein each of the initial scores associated with the each of the plurality of parallel learning models are normalized at least based in part on a feature vector of the each of the plurality of user image vectors and the plurality of claimed image vectors associated with the each of the plurality of parallel learning models.

7. The system of claim 1, wherein the at least one of the plurality of parallel learning models uses face embedding for matching the user image the claimed image.

8. A method comprising:
receiving, via a wireless network communication by a face verification system, a request for a user identification, the request including user information and a user image;
retrieving a claimed identity image corresponding to the user image based in part on the user information received;
inputting the claimed identity image and the user image to a plurality of parallel learning models in the face verification system;
determining, from the plurality of parallel learning models, a plurality of user image vectors from the user image and a plurality of claimed identity image vectors from the claimed identity image, wherein each of the plurality of user image vectors has a corresponding one of the plurality of claimed identity image vectors, and wherein the each of the plurality of user image vectors and the plurality of claimed identity image vectors have a distinct length of n-dimension features based on a corresponding one of the plurality of parallel learning models used for vector output;
determining, by the face verification system, an initial score associated with each of the plurality of parallel learning models based on comparing each of the plurality of user image vectors to the corresponding one of the plurality of claimed identity image vectors;
determining, by the face verification system, an ensemble score incorporating the initial scores associated with each of the plurality of parallel learning models; and
transmitting, over the wireless network communication, a user authentication in response to the request for the user identification when the ensemble score meets an ensemble criteria.

9. The method of claim 8, further comprising:
transmitting, over the wireless network communication by the face verification system, a validation request failure when the ensemble score does not meet a threshold criteria.

10. The method of claim 8, further comprising:
transmitting an access verification to a user device associated with the request for the user identification.

11. The method of claim 8, wherein the plurality of parallel learning models includes two or more machine learning models trained for image data analytics that process the user image with the claimed identity image in parallel.

12. The method of claim 11, wherein the determining the ensemble score is based in part on distance scores associated with the two or more machine learning models.

13. The method of claim 12, wherein the distance scores are determined as a result of one or more face embeddings from one or more of the plurality of user image vectors or the plurality of claimed identity image vectors.

14. A non-transitory machine-readable medium having stored thereon machine-readable instructions executable to cause a machine to perform operations comprising:
receiving, via a wireless network communication, a request for a user identification, the request including user information and a user image;
retrieving a claimed image corresponding to the user image based in part on the user information received;
inputting the claimed image and the user image to a plurality of parallel learning models in a face identification module;
determining, from the plurality of parallel learning models, a plurality of user image vectors from the user image and a plurality of claimed image vectors from the claimed image, wherein each of the plurality of user image vectors have a corresponding one of the plurality of claimed image vectors, and wherein the each of the plurality of user image vectors and the plurality of claimed image vectors have a distinct length of n-dimension features based on a corresponding one of the plurality of parallel learning models used for vector output;

determining, by the face identification module, an initial score associated with each of the plurality of parallel learning models based on comparing each of the plurality of user image vectors to the corresponding one of the plurality of claimed image vectors;

determining, by the face identification module, a final score incorporating the initial scores associated with each of the plurality of parallel learning models; and transmit, over the wireless network communication, a user authentication in response to the request for the user identification when the final score meets an ensemble criteria.

15. The non-transitory machine-readable medium of claim 14, wherein the operations further comprise:
transmitting, over the wireless network communication, a user authentication failure in response to the request for the user identification when the final score does not meet the ensemble criteria.

16. The non-transitory machine-readable medium of claim 14, wherein the operations further comprise:
in response to retrieving the claimed image, preprocessing the user image to align the user image with the claimed image.

17. The non-transitory machine-readable medium of claim 14, wherein the operations further comprise:
in response to retrieving the claimed image, preprocessing the user image to correct poor image resolution.

18. The non-transitory machine-readable medium of claim 14, wherein each of the plurality of parallel learning models include varying feature dimensions.

19. The non-transitory machine-readable medium of claim 14, wherein each of the initial scores associated with the each of the plurality of parallel learning models are normalized at least based in part on a feature vector of the each of the plurality of user image vectors and the plurality of claimed image vectors associated with the each of the plurality of parallel learning models.

20. The non-transitory machine-readable medium of claim 14, wherein the at least one of the plurality of parallel learning models uses face embedding for matching the user image the claimed image.

* * * * *